United States Patent
Bhattacharya et al.

(10) Patent No.: US 12,468,479 B2
(45) Date of Patent: Nov. 11, 2025

(54) SIMULTANEOUS DISTRIBUTED AND NON-DISTRIBUTED ADDRESS MAPS AND ROUTING PROTOCOLS IN A COMPUTING SYSTEM

(71) Applicant: NVIDIA CORPORATION, Santa Clara, CA (US)

(72) Inventors: Debajit Bhattacharya, San Jose, CA (US); Michael Allen Parker, San Jose, CA (US); Kun Fang, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 108 days.

(21) Appl. No.: 18/583,718

(22) Filed: Feb. 21, 2024

(65) Prior Publication Data

US 2025/0265008 A1 Aug. 21, 2025

(51) Int. Cl.
*G06F 3/06* (2006.01)
(52) U.S. Cl.
CPC .......... *G06F 3/0655* (2013.01); *G06F 3/0604* (2013.01); *G06F 3/0673* (2013.01)
(58) Field of Classification Search
CPC ..... G06F 3/0655; G06F 3/0604; G06F 3/0673
See application file for complete search history.

(56) References Cited

U.S. PATENT DOCUMENTS

| | | | | |
|---|---|---|---|---|
| 9,275,063 | B1 * | 3/2016 | Natanzon | G06F 3/0611 |
| 10,496,571 | B1 * | 12/2019 | Lamba | G06F 3/065 |
| 2009/0049234 | A1 * | 2/2009 | Oh | G06F 3/0647 |
| | | | | 711/E12.008 |
| 2010/0198936 | A1 * | 8/2010 | Burchard | H04L 49/9063 |
| | | | | 709/212 |
| 2012/0005423 | A1 * | 1/2012 | Zhuang | G06F 3/0653 |
| | | | | 711/E12.001 |

* cited by examiner

*Primary Examiner* — Sean D Rossiter
(74) *Attorney, Agent, or Firm* — Squire Patton Boggs LLP; Sarah Mirza (57) ABSTRACT

Various embodiments include techniques for performing memory operations in a computing system. A processing unit in the computing system performs memory operations by accessing memory using two concurrent memory address maps (AMAPs). The processing unit access memory via a first fine-grain distributed AMAP in order to access memory with high-bandwidth without imposing strict ordering of memory operations. The processing unit access memory via a second AMAP source-ordered non-distributed AMAP in order to access memory where memory synchronization latency is more important than memory bandwidth. By accessing memory via the two concurrent AMAPs, the processing unit can select between high-bandwidth memory access and source-ordered memory access interchangeably, depending on which is desired for each memory operation. Further, the fine-grain distributed AMAP and the source-ordered non-distributed AMAP can maintain synchronization and coherency between one another concurrently without software intervention, thereby alleviating the burden on the application programmer to manage the two AMAPs.

20 Claims, 5 Drawing Sheets

SIMULTANEOUS DISTRIBUTED AND NON-DISTRIBUTED ADDRESS MAPS AND ROUTING PROTOCOLS IN A COMPUTING SYSTEM

BACKGROUND

Field of the Various Embodiments

Various embodiments relate generally to computer system architectures and, more specifically, to simultaneous distributed and non-distributed address maps and routing protocols in a computing system.

Description of the Related Art

A computing system generally includes, among other things, one or more processing units, such as central processing units (CPUs) and/or graphics processing units (GPUs), and one or more memory systems. Processing units execute user mode software applications, which submit and launch compute tasks, executing on one or more compute engines included in the processing units. In some examples, processing units can provide high bandwidth to cache memory, such as a level 2 (L2) cache memory, by employing a partitioned, or sliced, memory architecture. With a partitioned memory architecture, the L2 cache memory is partitioned among multiple independent L2 slices, where each L2 slice has a separate path to the main memory. In some examples, the main memory includes video memory, system memory, and/or the like and is implemented with dynamic random-access memory (DRAM) devices.

To achieve high bandwidth memory access from the L2 cache memory, contiguous memory addresses, as viewed from the processing unit and/or other requesting processing units, are distributed among the L2 slices at a fine granularity. For example, a first memory address range spanning one or more cache lines can be directed to a first L2 slice, a second memory address range spanning one or more cache lines can be directed to a second L2 slice, a third memory address range spanning one or more cache lines can be directed to a third L2 slice, and so on, in a round robin fashion. High memory address bandwidth is achieved by directing accesses to contiguous memory addresses to different L2 slices in the L2 cache memory.

One disadvantage to this approach for accessing an L2 cache memory is that memory synchronization operations can lead to poor performance with such fine-grain distributed cache memory architectures. Given the parallel architecture of many processing units, the memory model of the computing system does not provide any guarantees for ordering between writes to different addresses from the same thread or different threads executing on a processing unit, where each thread is an instance of a program executing on the processing unit. In many cases, the processing unit can be a relaxed memory model processing unit, where thread instructions can execute out of order. Consequently, when a first thread executes a set of sequential memory operations, a later memory operation can complete while one or more of earlier memory operations is still outstanding. Therefore, after issuing a series of memory operations, the processing unit issues a memory synchronization operation, such as a memory barrier or a memory fence. This memory synchronization operation ensures that the data from the set of memory operations is visible in memory before instructions after the memory synchronization operation can execute.

When contiguous memory addresses are distributed among L2 slices in a fine-grain distributed manner, a memory synchronization operation issued after a set of memory operations to a block of contiguous memory addresses can involve synchronization across many L2 slices. Such synchronization across multiple L2 slices can take a significant amount of time to complete, consume thousands to tens of thousands of processor clock cycles, corresponding to a delay of multiple microseconds. As a result, these memory synchronization operations in systems with fine-grain L2 cache memory architectures can significantly reduce processor performance.

As the foregoing illustrates, what is needed in the art are more effective techniques for performing memory operations in a computing system with fine-grain cache memory architectures.

SUMMARY

Various embodiments of the present disclosure set forth a computer-implemented method for performing memory operations in a computing system. The method includes determining whether a first memory operation accesses memory via a first address map or a second address map. The method further includes, if the first memory operation accesses the memory via the first address map, then accessing the memory via a fine-grain distributed address map, or if the first memory operation accesses the memory via the second address map, then accessing the memory via a source-ordered non-distributed address map.

Other embodiments include, without limitation, a system that implements one or more aspects of the disclosed techniques, and one or more computer readable media including instructions for performing one or more aspects of the disclosed techniques, as well as a method for performing one or more aspects of the disclosed techniques.

At least one technical advantage of the disclosed techniques relative to the prior art is that, with the disclosed techniques a processing unit can concurrently use two different AMAPs to access cache memory with high-bandwidth or to access cache memory with source-ordering, depending on the needs of the particular application program. With the disclosed techniques, the fine-grain distributed AMAP and the source-ordered non-distributed AMAP can co-exist with little or no interference with one another. Further, the fine-grain distributed AMAP and the source-ordered non-distributed AMAP can maintain synchronization and coherency between one another concurrently without software intervention, thereby alleviating the burden on the application programmer to manage the two AMAPs. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
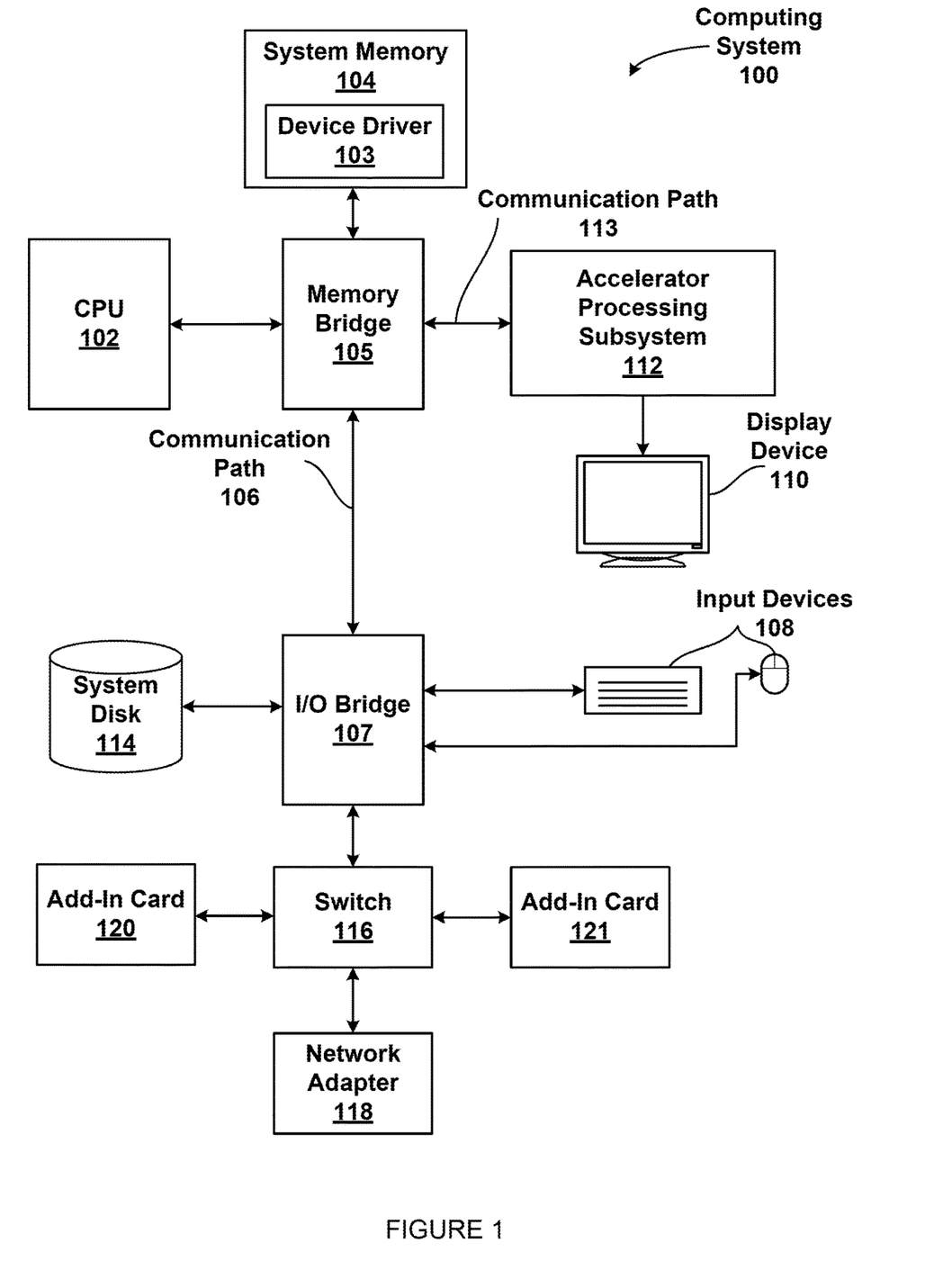
FIG. 1 is a block diagram of a computing system configured to implement one or more aspects of the various embodiments.

FIG. 1 is a block diagram of a computing system 100 configured to implement one or more aspects of the various embodiments. As shown, computing system 100 includes, without limitation, a central processing unit (CPU) 102 and a system memory 104 coupled to an accelerator processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. In some examples, input devices 108 are employed to verify the identities of one or more users in order to permit access of computing system 100 to authorized users and deny access of computing system 100 to unauthorized users. Switch 116 is configured to provide connections between I/O bridge 107 and other components of the computing system 100, such as a network adapter 118 and various add-in cards 120 and 121. In some examples, network adapter 118 serves as the primary or exclusive input device to receive input data for processing via the disclosed techniques.

As also shown, I/O bridge 107 is coupled to a system disk 114 that may be configured to store content and applications and data for use by CPU 102 and accelerator processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computing system 100, may be implemented using any technically suitable protocols, including, without limitation, Peripheral Component Interconnect Express (PCIe), HyperTransport, or any other bus or point-to-point communication protocol known in the art.

In some embodiments, accelerator processing subsystem 112 comprises a graphics subsystem that delivers pixels to a display device 110 that may be any conventional cathode ray tube, liquid crystal display, light-emitting diode display, or the like. In such embodiments, the accelerator processing subsystem 112 incorporates circuitry optimized for graphics and video processing, including, for example, video output circuitry. As described in greater detail below in FIG. 2, such circuitry may be incorporated across one or more accelerators included within accelerator processing subsystem 112. An accelerator includes any one or more processing units that can execute instructions such as a central processing unit (CPU), a parallel processing unit (PPU) of FIGS. 2-4, a graphics processing unit (GPU), a direct memory access (DMA) unit, an intelligence processing unit (IPU), neural processing unit (NAU), tensor processing unit (TPU), neural network processor (NNP), a data processing unit (DPU), a vision processing unit (VPU), an application specific integrated circuit (ASIC), a field-programmable gate array (FPGA), and/or the like.

In some embodiments, accelerator processing subsystem 112 includes two processors, referred to herein as a primary processor (normally a CPU) and a secondary processor. Typically, the primary processor is a CPU and the secondary processor is a GPU. Additionally or alternatively, each of the primary processor and the secondary processor may be any one or more of the types of accelerators disclosed herein, in any technically feasible combination. The secondary processor receives secure commands from the primary processor via a communication path that is not secured. The secondary processor accesses a memory and/or other storage system, such as system memory 104, Compute eXpress Link (CXL) memory expanders, memory managed disk storage, on-chip memory, and/or the like. The secondary processor accesses this memory and/or other storage system across an insecure connection. The primary processor and the secondary processor may communicate with one another via a GPU-to-GPU communications channel, such as Nvidia Link (NVLink). Further, the primary processor and the secondary processor may communicate with one another via network adapter 118. In general, the distinction between an insecure communication path and a secure communication path is application dependent. A particular application program generally considers communications within a die or package to be secure. Communications of unencrypted data over a standard communications channel, such as PCIe, are considered to be unsecure.

In some embodiments, the accelerator processing subsystem 112 incorporates circuitry optimized for general purpose and/or compute processing. Again, such circuitry may be incorporated across one or more accelerators included within accelerator processing subsystem 112 that are configured to perform such general purpose and/or compute operations. In yet other embodiments, the one or more accelerators included within accelerator processing subsystem 112 may be configured to perform graphics processing, general purpose processing, and compute processing operations. System memory 104 includes at least one device driver 103 configured to manage the processing operations of the one or more accelerators within accelerator processing subsystem 112.

In various embodiments, accelerator processing subsystem 112 may be integrated with one or more other the other elements of FIG. 1 to form a single system. For example, accelerator processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of accelerator processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, accelerator processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
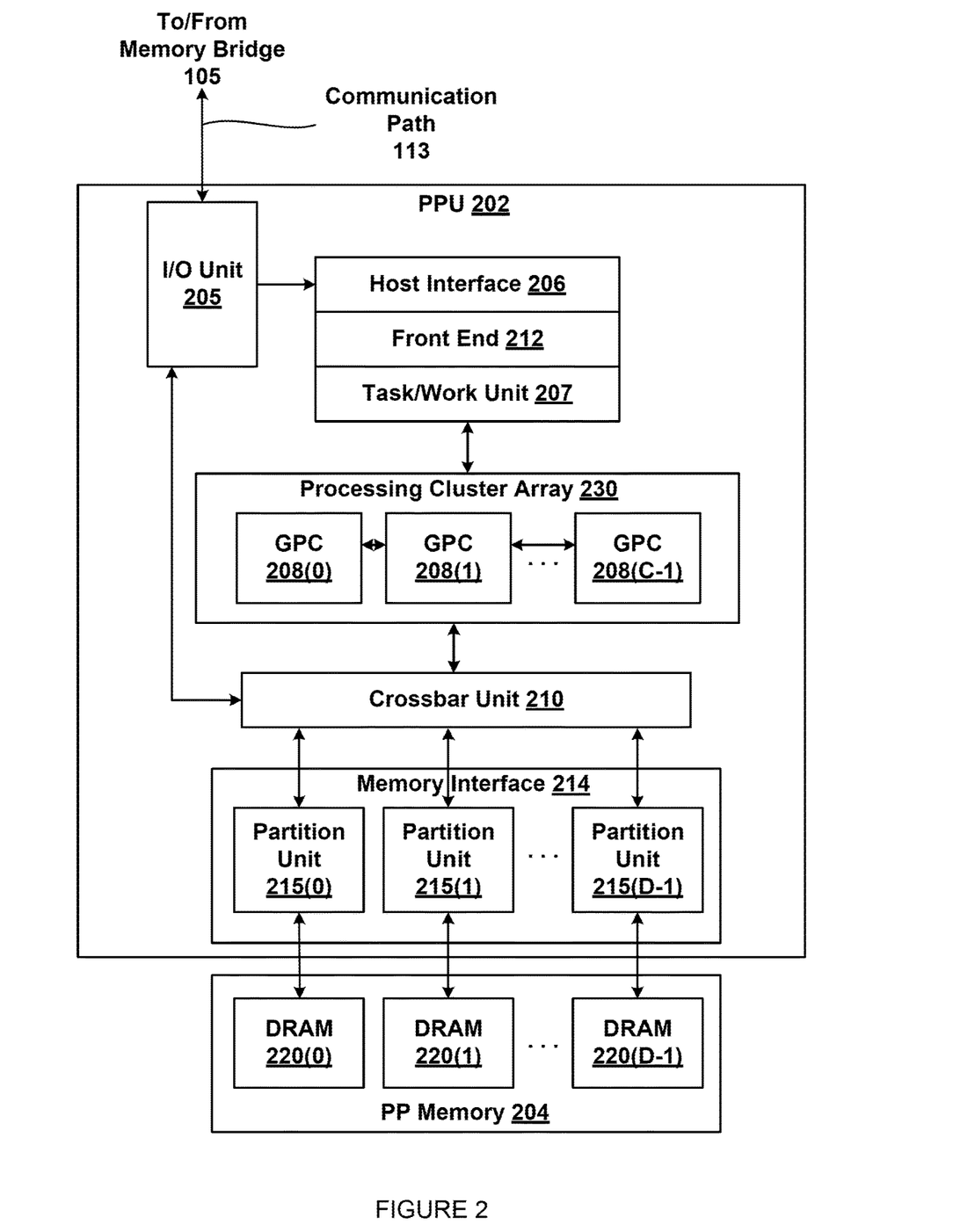
FIG. 2 is a block diagram of a parallel processing unit (PPU) included in the accelerator processing subsystem of FIG. 1, according to various embodiments.

FIG. 2 is a block diagram of a parallel processing unit (PPU) 202 included in the accelerator processing subsystem 112 of FIG. 1, according to various embodiments. Although FIG. 2 depicts one PPU 202, as indicated above, accelerator processing subsystem 112 may include any number of PPUs 202. Further, the PPU 202 of FIG. 2 is one example of an accelerator included in accelerator processing subsystem 112 of FIG. 1. Alternative accelerators include, without limitation, CPUs, GPUs, DMA units, IPUs, NPUs, TPUs, NNPs, DPUs, VPUs, ASICs, FPGAs, and/or the like. The techniques disclosed in FIGS. 2-4 with respect to PPU 202 apply equally to any type of accelerator(s) included within accelerator processing subsystem 112, in any combination. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computing system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. Additionally or alternatively, processors and/or accelerators other than CPU 102 may write one or more streams of commands for PPU 202 to a data structure. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computing system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computing system 100 may be varied. In some embodiments, accelerator processing subsystem 112, which includes at least one PPU 202, is implemented as an add-in card that can be inserted into an expansion slot of computing system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PP memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity, and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within accelerator processing subsystem 112, or another accelerator processing subsystem 112 within computing system 100.

As noted above, any number of PPUs 202 may be included in an accelerator processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
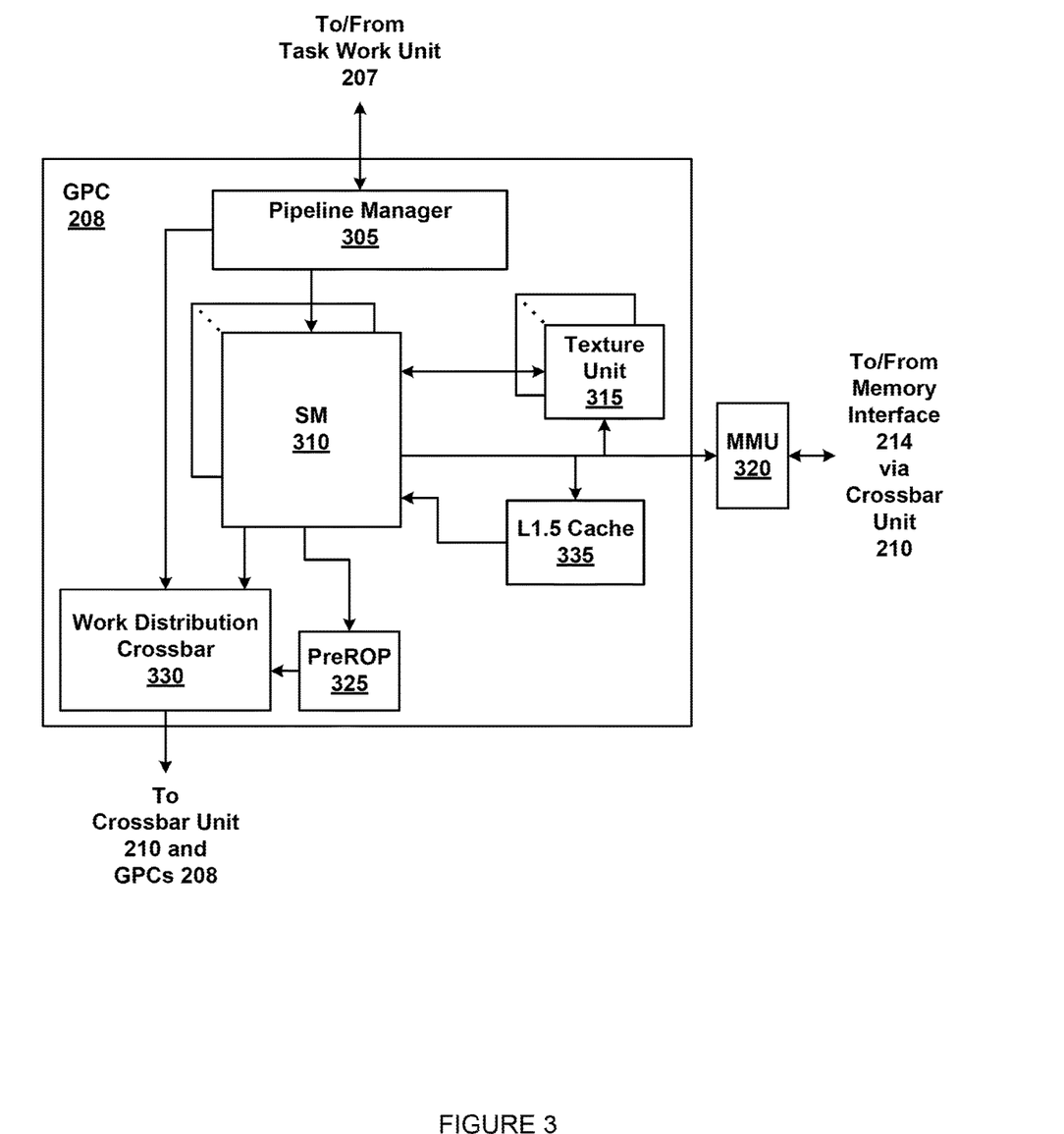
FIG. 3 is a block diagram of a general processing cluster (GPC) included in the parallel processing unit (PPU) of FIG. 2, according to various embodiments.

FIG. 3 is a block diagram of a general processing cluster (GPC) 208 included in the parallel processing unit (PPU) 202 of FIG. 2, according to various embodiments. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (e.g., AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In various embodiments, a software application written in the compute unified device architecture (CUDA) programming language describes the behavior and operation of threads executing on GPC 208, including any of the above-described behaviors and operations. A given processing task may be specified in a CUDA program such that the SM 310 may be configured to perform and/or manage general-purpose compute operations.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the various embodiments of the present disclosure.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Simultaneous Distributed and Non-Distributed Address Maps and Routing Protocols

Various embodiments include techniques for performing memory operations in a computing system with a cache memory. The computing system concurrently supports two memory address maps (AMAPs) for accessing memory. A first AMAP is a fine-grain distributed AMAP that supports high-bandwidth access to cache memory without imposing strict ordering of memory operations. A second AMAP is a source-ordered non-distributed AMAP that supports a class of applications that are more sensitive to memory synchronization latency than to memory bandwidth. These applications do not necessarily adhere to the traditional GPU memory-model, which was built with the fine-grain distributed AMAP in mind. Instead, for this class of applications, the source-ordered non-distributed AMAP provides ordering of memory operations in order to overcome the memory synchronization performance disadvantages associated with the fine-grain distributed AMAP. Further, techniques are disclosed to load-balance and optimize the performance of the source-ordered non-distributed AMAP across multiple processing units and other requesting sources.

The fine-grain distributed AMAP advantageously provides high performance and coherence among all sources accessing the same address in memory, also referred to herein as a memory address or a memory location. The source-ordered non-distributed AMAP is advantageous for certain latency critical applications where ordering is of the essence and high bandwidth is relatively less important. Because the fine-grain distributed AMAP and the source-ordered non-distributed AMAP are fundamentally different from one another, and because intermixing memory operations between these two AMAPs can lead to memory incoherency, the discloses techniques include a hardware-based solution to allow both AMAPs to work seamlessly together. Further, the disclosed techniques achieve these benefits without unduly burdening software programmers or application programs to include specific instructions or subroutines in the application program to manage these two AMAP configurations concurrently.

Figure 4:
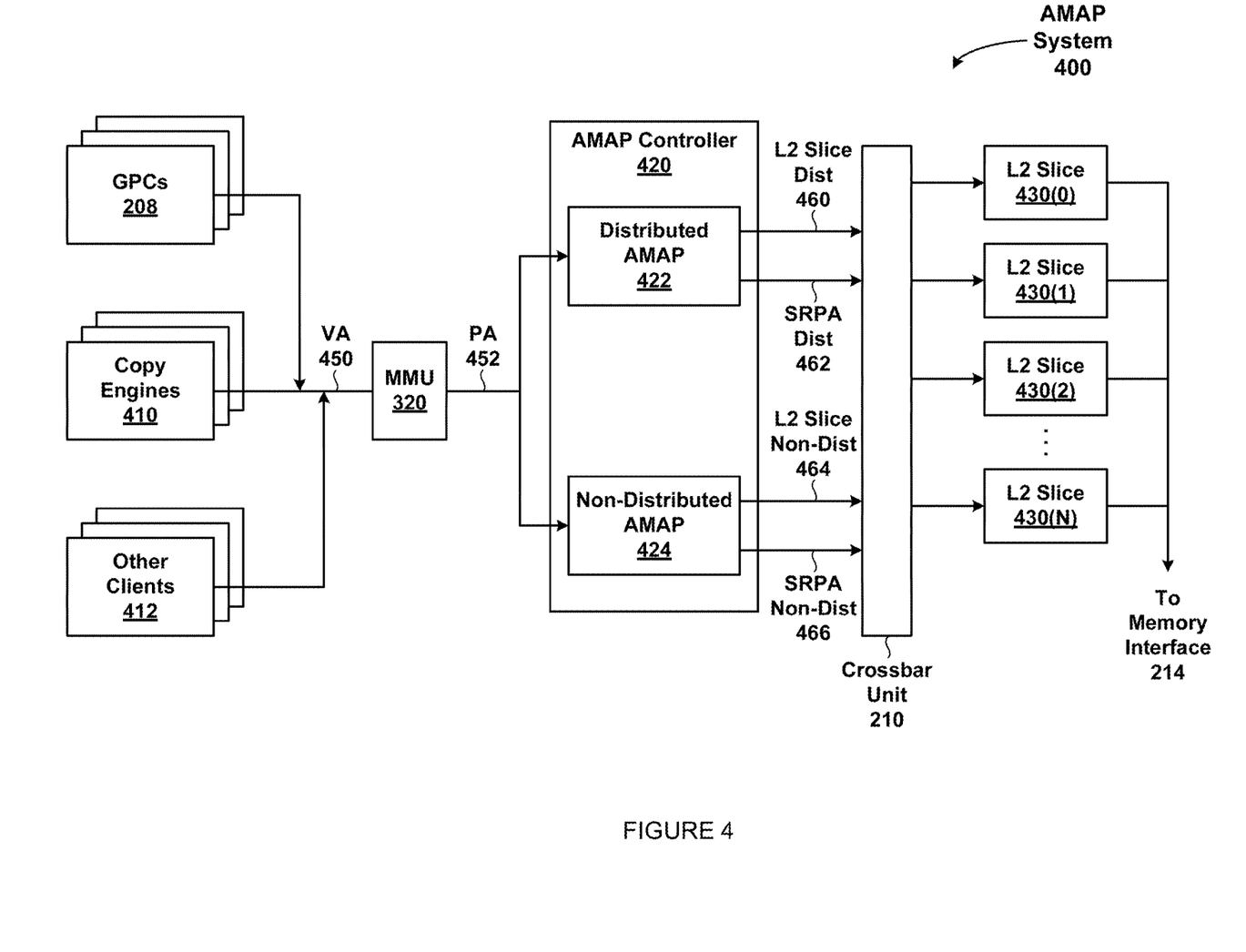
FIG. 4 is a block diagram of an address map (AMAP) system, according to various embodiments.

FIG. 4 is a block diagram of an address map (AMAP) system 400, according to various embodiments. As shown, the AMAP system 400 includes, without limitation, GPCs 208, copy engines 410, other clients 412, an MMU 320, an AMAP controller 420, a crossbar unit 210, and L2 slices 430(0)-430(N). AMAP controller 420 includes, without limitation, a distributed AMAP 422 and a non-distributed AMAP 424. L2 slices 430(0)-430(N) are also referred to herein as memory slices. As shown in FIG. 4, AMAP controller 420 follows MMU 320. Even so, in some embodiments, AMAP controller 420 can be included in and/or can serve as the back end portion of MMU 320.

GPCs 208 function essentially the same as described in conjunction with FIGS. 2-3. In that regard, each GPC 208 can be programmed to execute processing tasks relating to a wide variety of applications, including, without limitation, linear and nonlinear data transforms, filtering of video and/or audio data, modeling operations, image rendering operations, general compute operations, and/or the like. In operation, each GPC 208 is configured to generate memory operations to transfer data from system memory 104 and/or PP memory 204 to one or more on-chip memory units, process the data, and write result data back to system memory 104 and/or PP memory 204. These memory operations can transfer data to and from system memory 104 and/or PP memory 204 through L2 slices 430(0)-430(N) included in the L2 cache memory.

In operation, each processing unit can offload copy tasks to one or more copy engines 410 that perform dedicated copy operations, referred to herein as direct memory access (DMA) operations. More specifically, each process executing on a GPC 208, a CPU 102, and/or the like can submit work to a copy engine 410. Copy engines 410 have the capability to read data from a region of memory and then write the data into a different region of memory. Via a two-level pushbuffer structure, a copy engine 410 can be activated to perform these copy operations for a GPC 208, a CPU 102, and/or the like. Each GPC 208 is configured to generate memory operations to transfer data from system memory 104 and/or PP memory 204 to one or more on-chip memory units, process the data, and write result data back to system memory 104 and/or PP memory 204. These memory operations can transfer data to and from system memory 104 and/or PP memory 204 through L2 slices 430(0)-430(N) included in the L2 cache memory.

In operation, other clients 412 included in, or otherwise associated with, a GPC 208, a CPU 102, and/or the like are also configured generate memory operations to transfer data from system memory 104 and/or PP memory 204 to one or more on-chip memory units, process the data, and write result data back to system memory 104 and/or PP memory 204. These memory operations can transfer data to and from system memory 104 and/or PP memory 204 through L2 slices 430(0)-430(N) included in the L2 cache memory.

MMU 320 functions essentially the same as described in conjunction with FIG. 3. GPCs 208, copy engines 410, and other clients 412 generate memory operations, such as memory load operations, memory store operations, and/or the like and transmit the memory operations to MMU 320. GPCs 208, copy engines 410, and other clients 412 are referred to herein as sources. These memory operations include specific locations in memory as virtual addresses (VA) 450. The MMU 320 includes a set of page table entries (PTEs) used to map a virtual address 450 to a physical address 452 of a tile or memory page and optionally a cache line index. MMU 320 can include address translation lookaside buffers (TLB) or caches that can reside within one or more L1 caches, GPCs 208, SMs 310, a CPU 102, and/or the like. MMU 320 transmits the physical address 452 associated with the memory operation to AMAP controller 420.

AMAP controller 420 is configured to map a physical address 452 to an L2 slice and a slice-relative physical address. Memory controller generates the mapping via two AMAPs, namely, a distributed AMAP 422 and a non-distributed AMAP 424. If a memory operation accesses memory at a physical address 452 via a first address map, then AMAP controller 420 accesses memory via a fine-grain distributed address map (distributed AMAP) 422. Via distributed AMAP 422, AMAP controller 420 maps the physical address 452 to a distributed L2 slice identifier (L2 slice dist) 460 and a distributed slice-relative physical address (SRPA dist) 462. AMAP controller 420 transmits the memory operation, including the distributed L2 slice identifier 460 and the distributed slice-relative physical address 462, to crossbar unit 210.

If the memory operation accesses memory at a physical address 452 via a second address map, then AMAP controller 420 accesses memory via a source-ordered non-distributed address map (non-distributed AMAP) 424. Via non-distributed AMAP 424, AMAP controller 420 maps the physical address 452 to a non-distributed L2 slice identifier (L2 slice non-dist) 464 and a non-distributed slice-relative physical address (SRPA non-dist) 466. AMAP controller 420 transmits the memory operation, including the non-distributed L2 slice identifier 464 and the non-distributed slice-relative physical address 466, to crossbar unit 210.

Crossbar unit 210 functions essentially the same as described in conjunction with FIGS. 2-3. Crossbar unit 210 is configured to route memory operations generated by various sources to L2 slices 430 and, correspondingly, to system memory 104, PP memory 204, DRAM 220, and/or the like via memory interface 214. If crossbar unit 210 receives a memory operation from AMAP controller 420 via distributed AMAP 422, then crossbar unit 210 routes the memory operation, including distributed slice-relative physical address 462, to the L2 slice 430 identified by distributed L2 slice identifier 460. If crossbar unit 210 receives a memory operation from AMAP controller 420 via non-distributed AMAP 424, then crossbar unit 210 routes the memory operation, including non-distributed slice-relative physical address 466, to the L2 slice 430 identified by non-distributed L2 slice identifier 464.

L2 slices 430 are shared among all sources and can be used to transfer data between threads, application programs, execution streams, and/or the like. Each L2 slice 430 corresponds to a different portion of L2 cache memory and is configured to access, via memory interface 214, a corresponding subset of locations within system memory 104, PP memory 204, DRAM 220, and/or the like. Each L2 slice corresponds to a slice-relative physical address space that is accessible via distributed AMAP 422 and non-distributed AMAP 424.

In operation, when using distributed AMAP 422, AMAP controller 420 generates a mapping from the physical address 452 to a destination distributed L2 slice identifier 460. Further, when using distributed AMAP 422, AMAP controller 420 generates a mapping from the physical address 452 to a destination distributed slice-relative physical address 462. In some examples, the distributed slice-relative physical address 462 can be a trimmed version of the physical address 452. Accordingly, distributed slice-relative physical address 462 can be the least significant bits (LSBs) of the physical address 452. AMAP controller 420 transmits the memory operation, including the distributed L2 slice identifier 460 and the distributed slice-relative physical address 462, to crossbar unit 210. Crossbar unit 210 routes the memory operation to the destination distributed L2 slice identifier 460 along with the distributed slice-relative physical address 462.

The distributed slice-relative physical address 462 can have a fewer number of bits than the physical address 452. Further, the distributed AMAP 422 generates a unique mapping from the physical address 452 to the combination of the distributed L2 slice identifier 460 and the distributed slice-relative physical address 462, such that two different L2 slices 430 do not service the same physical address 452. Further, a given physical address 452 accesses the same L2 slice 430 at the same distributed slice-relative physical address 462 regardless of which source generates a memory operation. On the other hand, two different L2 slices 430 can service the same distributed slice-relative physical address 462, as long as the distributed slice-relative physical address 462 in the first L2 slice 430 corresponds to a different physical address 452 than the distributed slice-relative physical address 462 in the second L2 slice 430.

For memory operations targeted to a remote destination, AMAP controller 420 performs a reverse mapping operation to regenerate the physical address 452 when transmitting the memory operation to the I/O system coupled to the remote destination. AMAP controller 420 regenerates the physical address 452 from the distributed L2 slice identifier 460 and the distributed slice-relative physical address 462.

When using the distributed AMAP 422, AMAP controller 420 distributes the memory operations among the available L2 slices 430, thereby performing load-balancing across the L2 slices 430 to aid in performance. This process of distributing memory operations among the available L2 slices 430 can cause the memory operations from a single source to diverge to all available L2 slices 430. Further, when using the distributed AMAP 422, AMAP controller 420 does not guarantee that original order is maintained for memory operations generated by a single source.

In operation, when using non-distributed AMAP 424, AMAP controller 420 generates a mapping that does not cause the memory operations from a single source to diverge to multiple L2 slices 430. Further, when using non-distributed AMAP 424, AMAP controller 420 maintains the original order for memory operations generated by a single source, referred to herein as source-ordered memory operations.

To efficiently maintain source-ordered memory operations, non-distributed AMAP 424 generates mappings, and crossbar unit 210 correspondingly maps memory operations, according to two rules. First, non-distributed AMAP 424 maps physical addresses 452 from a given source to a fixed L2 slice 430. As a result, memory operations from the given source do not diverge across multiple L2 slices 430. Second, non-distributed AMAP 424 generates mappings such that the various sources, taken together, utilized the available L2 slices 430 more or less equally, such that memory operations are load-balanced across the sources and the L2 slices 430.

To achieve a load-balanced routing, non-distributed AMAP 424 generates non-distributed L2 slice identifier 464 based at least on the total available number (N) of L2 slices 430 and the total available number (M) of ordering sources. As described herein, a source can be any component that generates memory operations, such as GPCs 208, SMs 310, copy engines 410, and other clients 412. Additionally or alternatively, a source can be a component at a smaller granularity than an SM 310. Additionally or alternatively, a source can be one or more threads executing on an SM 310, such as a single thread, a thread group, a CTA, a group of CTAs, and/or the like. Such sources are referred to herein as ordering streams. For example, if each SM 310 executes X ordered streams, each GPC 208 includes Y SMs 310, and PPU 202 includes Z GPCs 208, then the total number of ordering sources in the PPU 202 is equal to: $M=X*Y*Z$.

In some examples, non-distributed AMAP 424 generates non-distributed L2 slice identifier 464 (slice_id) according to the Equation 1 below:

$$\text{slice\_id} = N \% G \qquad (1)$$

where N is the number of available L2 slices 430, G is a global source identifier for the ordering source, and % is the modulo operator. G varies from 0 to M−1, where M is the total number of ordering sources. Advantageously, the non-distributed L2 slice identifier 464 generated according to the Equation 1 is easy to compute and provides load-balanced routing across ordering sources and L2 slices 430.

In some examples, the global source identifier for each ordering source may be difficult to determine. In particular, at power up, device driver 103 or some other component evaluates PPU 202 to determine a set of available hardware resources. Certain hardware resources are sometimes not fabricated correctly during fabrication of a given PPU 202 and can be non-functional. In practice, these non-functional hardware resources are fused off and not used. However, other hardware resources within the given PPU 202 are functional and so that PPU 202 as a whole can still operate, albeit with lower performance. Salvaging partially functional PPUs and other types of units in the manner described is known in the art as "floorsweeping." SMs 310, GPCs 208, copy engines 410, and/or other clients 412 can be floorswept at different granularities. After floorsweeping, the set of global source identifier for the available ordering sources may no longer be contiguous, and/or each ordering source may be unable to determine the corresponding global source identifier.

Consequently, in some examples, non-distributed AMAP 424 generates non-distributed L2 slice identifier 464 (slice_id) according to the Equation 2 below:

$$\text{slice\_id} = (\text{gpc\_id}*w0 + \text{sm\_id}*w1 + \text{stream\_id}*w2 + \text{dest\_id}*w3) \% N \qquad (2)$$

where gpc_id is an identifier for the requesting GPC 208, sm_id is an identifier for the requesting SM 310, stream_id is an identifier for the requesting stream, dest_id is an identifier for the destination, and w0, w1, w2, and w3 are programmable weights. As shown, Equation 2 is a linear weighted function. The programmable weights w0, w1, w2, and w3 can be determined by studying desired performance outcomes. The programmable weights w0, w1, w2, and w3 can be statically assigned when computing system 100 is booted up.

For memory operations targeted to a remote destination, AMAP controller 420 performs a reverse mapping operation to regenerate the physical address 452 when transmitting the memory operation to the I/O system coupled to the remote destination. AMAP controller 420 regenerates the physical address 452 via at least two techniques.

The first technique is applicable when non-distributed AMAP 424 generates a non-distributed L2 slice identifier 464 that is different from the distributed L2 slice identifier 460 but generates a non-distributed slice-relative physical address 466 that is the same as the distributed slice-relative physical address 462. With this technique, AMAP controller 420, using non-distributed AMAP 424, computes the distributed L2 slice identifier and the distributed slice-relative physical address identical to the distributed L2 slice identifier 460 and the distributed slice-relative physical address 462 according to the distributed AMAP 422. AMAP controller 420, using non-distributed AMAP 424, computes non-distributed L2 slice identifier 464. AMAP controller 420 sets non-distributed slice-relative physical address 466 to equal distributed slice-relative physical address 462. AMAP controller 420 transmits the memory operation, distributed L2 slice identifier 460, and non-distributed slice-relative physical address 466 to the L2 slice 430 corresponding to non-distributed L2 slice identifier 464. During reverse mapping, AMAP controller 420 regenerates the physical address 452 based on distributed L2 slice identifier 460, and non-distributed slice-relative physical address 466. During reverse mapping, AMAP controller 420 advantageously can be unaware of any change in the forward mapping between non-distributed AMAP 424 vs. distributed AMAP 422. However, this technique can generate the same non-distributed slice-relative physical address 466 repeatedly for a set of memory operations. As a result, the same L2 slice 430 can receive multiple back-to-back memory operations to the same non-distributed slice-relative physical address 466, which can cause unnecessary L2 cache line interlocks, leading to performance degradation.

The second technique is applicable when non-distributed AMAP 424 generates a non-distributed L2 slice identifier 464 that is different from the distributed L2 slice identifier 460 and generates a non-distributed slice-relative physical address 466 that is different from the distributed slice-relative physical address 462. With this technique, non-distributed AMAP computes non-distributed L2 slice identifiers 464 and non-distributed slice-relative physical addresses 466 that are optimized for each L2 slice 430. The non-distributed slice-relative physical addresses 466 computed by non-distributed AMAP 424 may not match the distributed slice-relative physical addresses 462 computed by distributed AMAP 422. Advantageously, this technique does not generate the same non-distributed slice-relative physical address 466 multiple times to the same L2 slice 430. However, with this technique, memory controller needs to maintain mappings of the non-distributed slice-relative physical addresses 466 to the distributed slice-relative physical addresses 462 to support reverse mapping.

Because concurrent use of distributed AMAP 422 and non-distributed AMAP 424 could cause the same physical address 452 to map to two different L2 slices 430, resulting in aliasing. The two different L2 slices 430 are the L2 slice 430 identified by distributed L2 slice identifier 460 and the L2 slice 430 identified by non-distributed L2 slice identifier 464. To prevent coherency problems that could arise due to this aliasing, AMAP controller 420 sets or marks data associated with memory operations that use non-distributed AMAP 424 as uncacheable at the L2 slice 430. Because preventing such aliasing in the application program can be difficult, hardware in the AMAP controller 420 and/or L2 slices enforce memory operations that use non-distributed AMAP 424 to be uncacheable at the L2 slice 430.

When AMAP controller 420 uses non-distributed AMAP 424 to process a memory operation targeted to a remote destination, and the memory operation is transmitted to the I/O system coupled to the remote destination, AMAP controller 420 determines whether the physical address 452 was cached via distributed AMAP 422. If the physical address 452 was cached via distributed AMAP 422, then AMAP controller 420 invalidates the cache line corresponding to the distributed L2 slice identifier 460 and the distributed slice-relative physical address 462. By invalidating the cache line, AMAP controller 420 prevents other sources from reading stale data from the L2 slice 430 identified by distributed L2 slice identifier 460. The cache line invalidation can be performed via at least four techniques.

In a first technique, cache line invalidation can be performed by L2 slices 430 communicating with each other. When a memory operation is processed via non-distributed AMAP 424, AMAP controller 420 transmits, via crossbar unit 210, the memory operation to the L2 slice 430 identified by non-distributed L2 slice identifier 464. Along with the memory operation, AMAP controller 420 also transmits distributed L2 slice identifier 460 and non-distributed slice-relative physical address 466.

The L2 slice 430 compares distributed L2 slice identifier 460 with the L2 slice identifier of the L2 slice 430. If distributed L2 slice identifier 460 and the L2 slice identifier of the L2 slice 430 are equal, then the physical address 452 for the memory operation maps to the same L2 slice 430 whether processed by distributed AMAP 422 or non-distributed AMAP 424. In such cases, L2 slice 430 can process the memory operation without invalidating a cache line in another L2 slice 430. If distributed L2 slice identifier 460 and the L2 slice identifier of the L2 slice 430 are not equal, then the physical address 452 for the memory operation maps to a different L2 slice 430 if processed by distributed AMAP 422 rather than non-distributed AMAP 424. In such cases, the L2 slice 430 transmits an invalidation operation to the L2 slice 430 identified by distributed L2 slice identifier 460. Upon receiving the invalidation operation, the L2 slice 430 identified by distributed L2 slice identifier 460 determines whether the cache line at the distributed slice-relative physical address 462 is populated. If the cache line at the distributed slice-relative physical address 462 is populated, then the L2 slice 430 identified by distributed L2 slice identifier 460 invalidates the cache line. Whether or not the cache line is populated, the L2 slice 430 identified by distributed L2 slice identifier 460 transmits an invalidation acknowledgement to the L2 slice 430 identified by non-distributed L2 slice identifier 464. Upon receiving the invalidation acknowledgement, the L2 slice 430 identified by non-distributed L2 slice identifier 464 proceeds with executing the memory operation processed by non-distributed AMAP 424.

In a second technique, cache line invalidation can be performed by a source communicating with an L2 slice 430 at a per request granularity. The second technique is substantially similar to the first technique, but is performed by the source rather than an L2 slice.

The source compares distributed L2 slice identifier 460 with non-distributed L2 slice identifier 464. If distributed L2 slice identifier 460 and non-distributed L2 slice identifier 464 are equal, then the physical address 452 for the memory operation maps to the same L2 slice 430 whether processed by distributed AMAP 422 or non-distributed AMAP 424. In such cases, the source does not need to invalidate a cache line in another L2 slice 430. The L2 slice 430 identified by non-distributed L2 slice identifier 464 L2 slice 430 can process the memory operation. If distributed L2 slice identifier 460 and non-distributed L2 slice identifier 464 are not equal, then the physical address 452 for the memory operation maps to a different L2 slice 430 if processed by distributed AMAP 422 rather than non-distributed AMAP 424. In such cases, the source transmits an invalidation operation to the L2 slice 430 identified by distributed L2 slice identifier 460. Upon receiving the invalidation operation, the L2 slice 430 identified by distributed L2 slice identifier 460 determines whether the cache line at the distributed slice-relative physical address 462 is populated. If the cache line at the distributed slice-relative physical address 462 is populated, then the L2 slice 430 identified by distributed L2 slice identifier 460 invalidates the cache line. Whether or not the cache line is populated, the L2 slice 430 identified by distributed L2 slice identifier 460 transmits an invalidation acknowledgement to the source. Upon receiving the invalidation acknowledgement, the source transmits the memory operation to the L2 slice 430 identified by non-distributed L2 slice identifier 464. The L2 slice 430 identified by non-distributed L2 slice identifier 464 proceeds with executing the memory operation processed by non-distributed AMAP 424

In a third technique, cache line invalidation can be performed by a source communicating with an L2 slice 430 at a memory synchronization operation granularity. In some examples, transmitting invalidation operations on a per request basis can degrade performance. To reduce this performance degradation, each source can perform the steps of the second technique without transmitting the invalidation operation. Instead, the source maintains a list of distributed L2 slice identifiers 460 and corresponding distributed slice-relative physical addresses 462 that are pending invalidation. The source consolidates this list and transmits the invalidation operations in bulk. The source transmits a memory synchronization operation to ensure that all of the invalidation operations are visible at the corresponding destination L2 slices 430. With this third technique, the source does not need to hold the corresponding non-distributed AMAP 424 memory operations for invalidation acknowledgements from the destination L2 slices 430. However, this technique assumes that a memory synchronization operation issues at some point when at least one invalidation operation is pending at the source.

In a fourth technique, cache line invalidation can be performed by a source communicating with an L2 slice 430 at full L2 slice granularity. Maintaining a list of distributed L2 slice identifiers 460 and corresponding distributed slice-relative physical addresses 462 that are pending invalidation, as per the third technique, can consume a significant amount of memory. In such cases, the source maintains a list of distributed L2 slice identifiers 460 that are pending invalidation. The source does not maintain a list of distributed slice-relative physical addresses 462. Instead, the source transmits an invalidation operation to invalidate the entire L2 slice identified by the distributed L2 slice identifiers 460 in the list. The source consolidates this list and transmits the invalidation operations in bulk. The source transmits a memory synchronization operation to ensure that all of the invalidation operations are visible at the corresponding destination L2 slices 430. Note that performing slice-level invalidation can degrade performance. One technique to mitigate the performance degradation associated with L2 slice 430 level invalidation is for multiple sources to transmit invalidation operations to a common point, such as a hub. The hub consolidates the invalidation operations received from the multiple sources and eliminates duplicates where multiple sources transmit invalidation operations for the same L2 slice 430. After consolidation, the hub transmits a single slice level invalidation operation to each L2 slice 430 that appears in the list. In this manner, the hub can perform large-scale invalidation on behalf of multiple sources.

In some examples, memory operations processed via non-distributed AMAP 424 can interfere with memory operations processed via distributed AMAP 422, which can lead to reduced performance. In particular, the L2 slices 430 are configured to sense memory operations processed via non-distributed AMAP 424 as being different from memory operations processed via distributed AMAP 422.

As described herein, to prevent coherency problems that could arise due to aliasing, AMAP controller 420 sets memory operations that use non-distributed AMAP 424 as uncacheable at the L2 slice 430. Consequently, if an L2 slice receives a memory operation directed to a slice-relative physical address that is already cached at the L2 slice 430, then the L2 slice 430 concludes that the data already cached at the slice-relative physical address is from a memory operation processed via distributed AMAP 422. Therefore, when a subsequent memory operation accesses a slice-relative physical address that is already cached at the L2 slice 430, the L2 slice 430 can evict the data cached at the slice-relative physical address and process the incoming memory operation. However, if the incoming memory operation is processed via non-distributed AMAP 424, then the incoming memory operation is uncacheable, and the cacheline at the slice-relative physical address is needlessly evicted.

To prevent premature eviction, the L2 slice first determines whether an incoming memory operation is processed via non-distributed AMAP 424. If incoming memory operation is processed via non-distributed AMAP 424, then the L2 slice does not evict a cacheline that is previously stored at the same slice-relative physical address as the incoming memory operation. Checking the indicator of a non-distributed AMAP memory operation before checking the cache line preserves the earlier cached data, thereby reducing interference to distributed AMAP 422 memory operations from non-distributed AMAP 424 memory operations.

As a further optimization, there are cases where a physical address 452 maps to the same L2 slice 430 and slice-relative physical address whether processed via distributed AMAP 422 or via non-distributed AMAP 424. In such cases, distributed AMAP 422 memory operations and non-distributed AMAP 424 memory operations do not interfere with one another and do not result in coherency issues. In such cases, non-distributed AMAP 424 memory operations to such a physical address 452 do not need to be set as uncacheable at the L2 slice 430.

Figure 5:
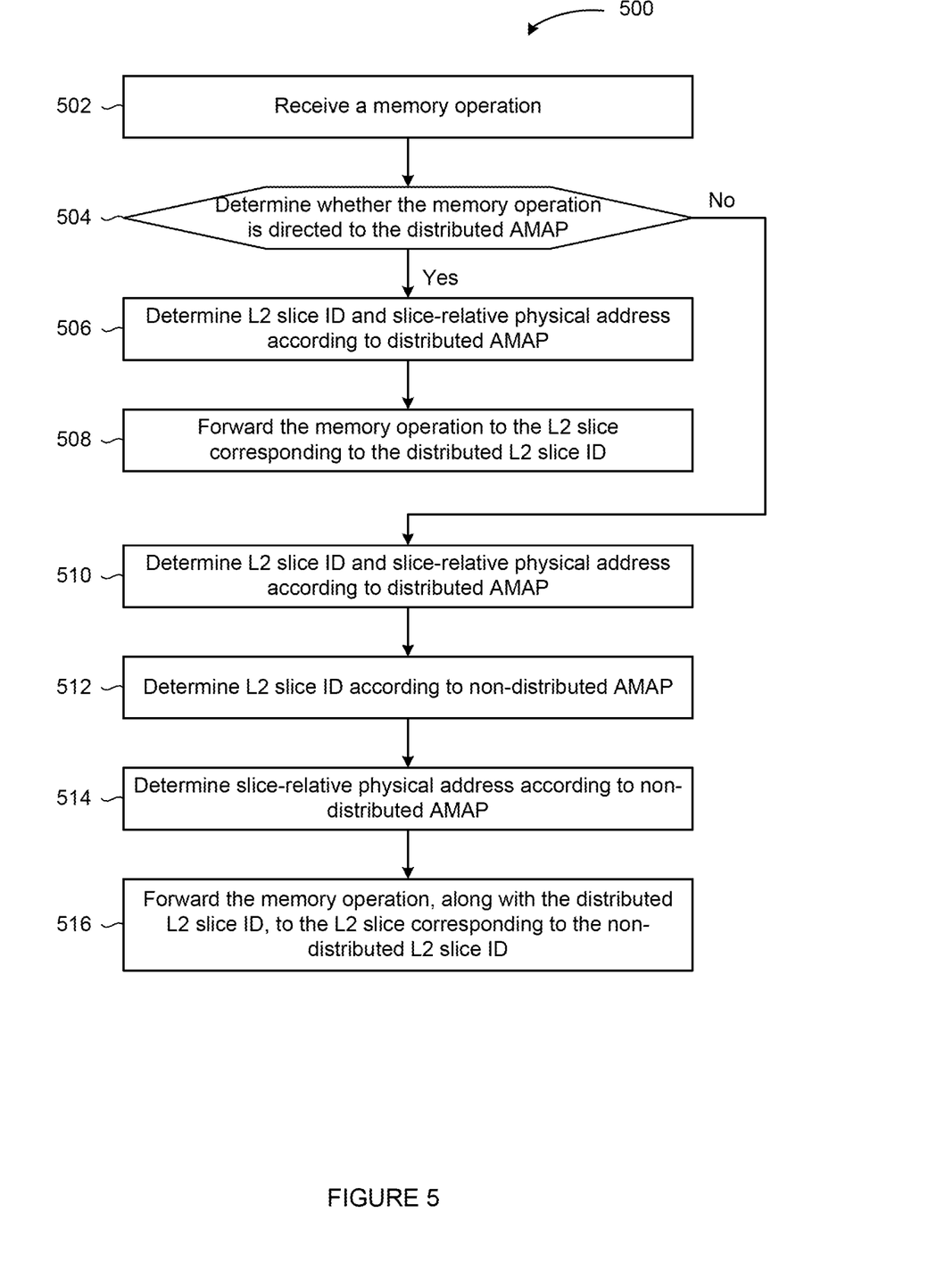
FIG. 5 is a flow diagram of method steps for processing memory operations executed by an SM of FIG. 3, according to various embodiments.

FIG. 5 is a flow diagram of method steps for processing memory operations executed by an SM 310 of FIG. 3, according to various embodiments. Additionally or alternatively, the method steps can be performed by one or more alternative accelerators including, without limitation, CPUs, GPUs, DMA units, IPUs, NPUs, TPUs, NNPs, DPUs, VPUs, ASICs, FPGAs, and/or the like, in any combination. Although the method steps are described in conjunction with the systems of FIGS. 1-4, persons of ordinary skill in the art will understand that any system configured to perform the method steps, in any order, is within the scope of the present disclosure.

As shown, a method 500 begins at step 502, where a memory controller, such as AMAP controller 420 of FIG. 4, receives a memory operation, such as a memory load operation, a memory store operation, and/or the like. The memory controller can receive the memory operation from any source, where a source can be any component that generates memory operations, such as GPCs 208, SMs 310, copy engines 410, and other clients 412. Additionally or alternatively, a source can be a component at a smaller granularity than an SM 310. Additionally or alternatively, a source can be one or more threads executing on an SM 310, such as a single thread, a thread group, a CTA, a group of CTAs, and/or the like.

At step 504, the memory controller determines whether the memory operation is directed to the distributed address map (AMAP). The memory controller processes memory operations directed to two AMAPs, namely, a distributed AMAP 422 and a non-distributed AMAP 424. If a memory operation accesses memory at a physical address 452 via a first address map, then the memory controller accesses memory via a fine-grain distributed address map 422. If the memory operation accesses memory at a physical address 452 via a second address map, then the memory controller accesses memory via a source-ordered non-distributed address map 424.

If the memory controller determines that the memory operation is directed to the distributed AMAP, then the method proceeds to step 506, where the memory controller determines a L2 slice ID and slice-relative physical address according to the distributed AMAP. In operation, when using distributed AMAP 422, the memory controller generates a mapping from the physical address 452 associated with the memory operation to a destination distributed L2 slice identifier 460. Further, when using distributed AMAP 422, the memory controller generates a mapping from the physical address 452 to a destination distributed slice-relative physical address 462. In some examples, the distributed slice-relative physical address 462 can be a trimmed version of the physical address 452. Accordingly, distributed slice-relative physical address 462 can be the least significant bits (LSBs) of the physical address 452.

At step 508, the memory controller forwards the memory operation to the L2 slice in the L2 cache memory corresponding to the distributed L2 slice ID. The memory controller transmits the memory operation, including the distributed L2 slice identifier 460 and the distributed slice-relative physical address 462, to a crossbar unit 210. Crossbar unit 210 routes the memory operation to the destination distributed L2 slice identifier 460 along with the distributed slice-relative physical address 462.

When using the distributed AMAP 422, the memory controller distributes the memory operations among the available L2 slices 430, thereby performing load-balancing across the L2 slices 430 to aid in performance. This process of distributing memory operations among the available L2 slices 430 can cause the memory operations from a single source to diverge to all available L2 slices 430. Further, when using the distributed AMAP 422, the memory controller does not guarantee that original order is maintained for memory operations generated by a single source.

The method 500 then terminates. Alternatively, the method 500 proceeds to step 502 to receive and process additional memory operations.

Returning to step 504, if the memory controller determines that the memory operation is not directed to the distributed AMAP, then the memory operation is directed to the non-distributed AMAP, and the method proceeds to step 510, where the memory controller determines a L2 slice ID and slice-relative physical address according to the distributed AMAP, as described in conjunction with step 506.

At step 512, the memory controller determines an L2 slice ID according to the non-distributed AMAP. Non-distributed AMAP 424 maps physical addresses 452 from a given source to a fixed L2 slice 430. As a result, memory operations from the given source do not diverge across multiple L2 slices 430. Second, non-distributed AMAP 424 generates mappings such that the various sources, taken together, utilized the available L2 slices 430 more or less equally, such that memory operations are load-balanced across the sources and the L2 slices 430.

To achieve a load-balanced routing, non-distributed AMAP 424 generates non-distributed L2 slice identifier 464 based at least on the total available number (N) of L2 slices 430 and the total available number (M) of ordering sources. In operation, when using non-distributed AMAP 424, the memory controller generates a mapping that does not cause the memory operations from a single source to diverge to multiple L2 slices 430. Further, when using non-distributed AMAP 424, the memory controller maintains the original order for memory operations generated by a single source, referred to herein as source-ordered memory operations.

At step 514, the memory controller determines a slice-relative physical address according to the non-distributed AMAP. In some examples, generates a non-distributed slice-relative physical address 466 that is the same as the distributed slice-relative physical address 462. In such examples, the memory controller, using non-distributed AMAP 424, computes the distributed L2 slice identifier and the distributed slice-relative physical address identical to the distributed L2 slice identifier 460 and the distributed slice-relative physical address 462 according to the distributed AMAP 422. The memory controller sets non-distributed slice-relative physical address 466 to equal distributed slice-relative physical address 462.

In some examples, generates a non-distributed slice-relative physical address 466 that is different from the distributed slice-relative physical address 462. In such examples, non-distributed AMAP computes non-distributed L2 slice identifiers 464 and non-distributed slice-relative physical addresses 466 that are optimized for each L2 slice 430. The non-distributed slice-relative physical addresses 466 computed by non-distributed AMAP 424 may not match the distributed slice-relative physical addresses 462 computed by distributed AMAP 422. Advantageously, this technique does not generate the same non-distributed slice-relative physical address 466 multiple times to the same L2 slice 430, which can lead to reduced performance.

At step 516, the memory controller the memory controller forwards the memory operation, along with the distributed L2 slide ID, to the L2 slice in the L2 cache memory corresponding to the non-distributed L2 slice ID. The memory controller transmits the memory operation, including the distributed L2 slice identifier 460, non-distributed L2 slice identifier 464, and the non-distributed slice-relative physical address 466, to crossbar unit 210. Crossbar unit 210 routes the memory operation to the destination distributed L2 slice identifier 460 along with the distributed slice-relative physical address 462.

The method 500 then terminates. Alternatively, the method 500 proceeds to step 502 to receive and process additional memory operations.

In sum, various embodiments include techniques for performing memory operations in a computing system with a cache memory. The computing system concurrently supports two memory address maps (AMAPs) for accessing memory. A first AMAP is a fine-grain distributed AMAP that supports high-bandwidth access to cache memory without imposing strict ordering of memory operations. A second AMAP is a source-ordered non-distributed AMAP that supports a class of applications that are more sensitive to memory synchronization latency than to memory bandwidth. These applications do not necessarily adhere to the traditional GPU memory-model, which was built with the fine-grain distributed AMAP in mind. Instead, for this class of applications, the source-ordered non-distributed AMAP provides ordering of memory operations in order to overcome the memory synchronization performance disadvantages associated with the fine-grain distributed AMAP. Further, techniques are disclosed to load-balance and optimize the performance of the source-ordered non-distributed AMAP across multiple processing units and other requesting sources.

At least one technical advantage of the disclosed techniques relative to the prior art is that, with the disclosed techniques a processing unit can concurrently use two different AMAPs to access cache memory with high-bandwidth or to access cache memory with source-ordering, depending on the needs of the particular application program. With the disclosed techniques, the fine-grain distributed AMAP and the source-ordered non-distributed AMAP can co-exist with little or no interference with one another. Further, the fine-grain distributed AMAP and the source-ordered non-distributed AMAP can maintain synchronization and coherency between one another concurrently without software intervention, thereby alleviating the burden on the application programmer to manage the two AMAPs. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing memory operations, the method comprising:
   determining whether a first memory operation accesses memory via a first address map or a second address map; and
   if the first memory operation accesses the memory via the first address map, then accessing the memory via a fine-grain distributed address map, or
   if the first memory operation accesses the memory via the second address map, then accessing the memory via a source-ordered non-distributed address map.

2. The computer-implemented method of claim 1, wherein accessing the memory via the source-ordered non-distributed address map comprises:
   computing a first slice identifier and a first address for the first memory operation based on a first physical address associated with the first memory operation and the fine-grain distributed address map;
   computing a second slice identifier for the first memory operation based on the first physical address and the source-ordered non-distributed address map; and
   transmitting the first memory operation to a first memory slice included in the memory, wherein the first memory slice is identified by the second slice identifier.

3. The computer-implemented method of claim 2, wherein the first memory operation causes the first memory slice to access a memory address identified by the first address.

4. The computer-implemented method of claim 2, wherein accessing the memory via the source-ordered non-distributed address map further comprises:
  transmitting the first slice identifier to the first memory slice along with the first memory operation.

5. The computer-implemented method of claim 4, further comprising:
  performing a reverse mapping operation to generate a second physical address based on the first slice identifier and the first address, wherein the second physical address is equal to the first physical address.

6. The computer-implemented method of claim 2, wherein accessing the memory via the source-ordered non-distributed address map further comprises:
  computing a second address for the first memory operation based on the first physical address and the source-ordered non-distributed address map.

7. The computer-implemented method of claim 6, wherein the first memory operation causes the first memory slice to access a memory address identified by the second address.

8. The computer-implemented method of claim 6, wherein accessing the memory via the source-ordered non-distributed address map further comprises:
  transmitting the first slice identifier and the first address to the first memory slice along with the first memory operation.

9. The computer-implemented method of claim 8, further comprising:
  performing a reverse mapping operation to generate a second physical address based on the first slice identifier and the first address, wherein the second physical address is equal to the first physical address.

10. The computer-implemented method of claim 2, wherein accessing the memory via the source-ordered non-distributed address map further comprises marking data associated with the first memory operation as uncacheable at the first memory slice.

11. The computer-implemented method of claim 2, wherein the first memory slice:
  determines that the first slice identifier is different from a third slice identifier of the first memory slice, wherein the third slice identifier is equal to the second slice identifier;
  transmits a first invalidation operation that includes the first address to a second memory slice included in the memory and identified by the first slice identifier;
  receives an invalidation acknowledgement from the second memory slice in response to the first invalidation operation; and
  accesses a memory address identified by the first address.

12. The computer-implemented method of claim 11, wherein the first invalidation operation invalidates a memory location in the first memory slice located at the first address.

13. The computer-implemented method of claim 2, wherein accessing the memory via the source-ordered non-distributed address map further comprises, prior to transmitting the first memory operation to the first memory slice:
  determining that the first slice identifier is different from the second slice identifier;
  transmitting a first invalidation operation that includes the first address to a second memory slice included in the memory and identified by the first slice identifier; and
  receiving an invalidation acknowledgement from the second memory slice in response to the first invalidation operation,
  wherein the first memory slice accesses a memory address identified by the first address.

14. The computer-implemented method of claim 13, wherein the first invalidation operation invalidates a memory location in the first memory slice located at the first address.

15. The computer-implemented method of claim 13, wherein:
  the first invalidation operation is transmitted via a memory synchronization operation that includes the first invalidation operation and a second invalidation operation, and
  the first memory operation is transmitted to the first memory slice prior to receiving the invalidation acknowledgement from the second memory slice.

16. The computer-implemented method of claim 13, wherein the first invalidation operation invalidates all memory locations in the first memory slice.

17. The computer-implemented method of claim 13, wherein, when accessing the memory via the source-ordered non-distributed address map, existing data stored in a cache memory at an address associated with the first memory operation is not evicted the cache memory.

18. A system comprising:
  a memory including instructions;
  a processor that is coupled to the memory and, when executing the instructions:
  executes a first memory operation; and
  an address map controller that is coupled to the memory and the processor, and that:
    determines whether the first memory operation accesses memory via a first address map or a second address map; and
    if the first memory operation accesses the memory via the first address map, then accesses the memory via a fine-grain distributed address map, or
    if the first memory operation accesses the memory via the second address map, then accesses the memory via a source-ordered non-distributed address map.

19. The system of claim 18, wherein to access the memory via the source-ordered non-distributed address map, the address map controller:
  computes a first slice identifier and a first address for the first memory operation based on a first physical address associated with the first memory operation and the fine-grain distributed address map;
  computes a second slice identifier for the first memory operation based on the first physical address and the source-ordered non-distributed address map; and
  transmits the first memory operation and the first slice identifier to a first memory slice included in the memory, wherein the first memory slice is identified by the second slice identifier.

20. The system of claim 19, wherein the first memory operation causes the first memory slice to access a memory address identified by the first address.

* * * * *